(12) United States Patent
Kusano et al.

(10) Patent No.: US 9,938,444 B2
(45) Date of Patent: Apr. 10, 2018

(54) METHOD FOR PRODUCING SILICON NITRIDE SUBSTRATE

(71) Applicant: Japan Fine Ceramics Co., LTD., Miyagi (JP)

(72) Inventors: Dai Kusano, Miyagi (JP); Gen Tanabe, Miyagi (JP); Kiyoshi Hirao, Aichi (JP); Hideki Hyuga, Aichi (JP); You Zhou, Aichi (JP)

(73) Assignee: Japan Fine Ceramics Co., LTD., Miyagi (JP)

( * ) Notice: Subject to any disclaimer, the term of this patent is extended or adjusted under 35 U.S.C. 154(b) by 0 days.

(21) Appl. No.: 15/121,443

(22) PCT Filed: Mar. 31, 2015

(86) PCT No.: PCT/JP2015/060252
§ 371 (c)(1),
(2) Date: Aug. 25, 2016

(87) PCT Pub. No.: WO2015/152292
PCT Pub. Date: Oct. 8, 2015

(65) Prior Publication Data
US 2016/0362592 A1  Dec. 15, 2016

(30) Foreign Application Priority Data

Mar. 31, 2014 (JP) ................................. 2014-074340
Mar. 31, 2015 (JP) ................................. 2015-072347

(51) Int. Cl.
*C04B 35/591* (2006.01)
*C09K 5/14* (2006.01)
(Continued)

(52) U.S. Cl.
CPC .............. *C09K 5/14* (2013.01); *C04B 35/591* (2013.01); *C04B 35/6303* (2013.01);
(Continued)

(58) Field of Classification Search
CPC ........ C04B 335/591; C04B 2235/3206; C04B 2235/3224–2235/2235
See application file for complete search history.

(56) References Cited

U.S. PATENT DOCUMENTS 5,674,793 A * 10/1997 Hirao .................. C04B 35/5935
117/7
5,866,245 A *  2/1999 Toriyama ................ B32B 18/00
156/89.27
(Continued)

FOREIGN PATENT DOCUMENTS

JP  H09-030866  2/1997
JP  H11-236270  8/1999
(Continued)

OTHER PUBLICATIONS

International Search Report dated Jun. 23, 2015.
(Continued)

*Primary Examiner* — Erin Snelting
(74) *Attorney, Agent, or Firm* — IPUSA, PLLC

(57) ABSTRACT

A method for producing a silicon nitride substrate includes a raw material powder preparation step of preparing a raw material powder containing a silicon powder, a rare earth element compound, and a magnesium compound, wherein, when the amount of silicon in the raw material powder is expressed in terms of a silicon nitride content, the raw material powder contains the rare earth element compound at 1 mol % to 7 mol % in terms of an oxide content and contains the magnesium compound at 8 mol % to 15 mol % in terms of an oxide content; a sheet forming step of forming the raw material powder into a sheet article; a nitriding step of heating the sheet article in a nitrogen atmosphere at 1200° C. to 1500° C. and nitriding silicon contained in the sheet (Continued)

article; and a sintering step of sintering the sheet article under a nitrogen atmosphere after the nitriding step.

7 Claims, 2 Drawing Sheets

(51) Int. Cl.
*C04B 35/63* (2006.01)
*C04B 35/65* (2006.01)

(52) U.S. Cl.
CPC ...... *C04B 35/65* (2013.01); *C04B 2235/3206* (2013.01); *C04B 2235/3224* (2013.01); *C04B 2235/3225* (2013.01); *C04B 2235/3227* (2013.01); *C04B 2235/3852* (2013.01); *C04B 2235/3873* (2013.01); *C04B 2235/3891* (2013.01); *C04B 2235/428* (2013.01); *C04B 2235/46* (2013.01); *C04B 2235/5436* (2013.01); *C04B 2235/5445* (2013.01); *C04B 2235/602* (2013.01); *C04B 2235/608* (2013.01); *C04B 2235/658* (2013.01); *C04B 2235/6587* (2013.01); *C04B 2235/77* (2013.01); *C04B 2235/94* (2013.01); *C04B 2235/9607* (2013.01)

(56) References Cited

U.S. PATENT DOCUMENTS

| | | | | |
|---|---|---|---|---|
| 5,902,542 | A * | 5/1999 | Hirao | C04B 35/5935 264/639 |
| 5,928,601 | A * | 7/1999 | Miyake | C04B 35/591 264/659 |
| 5,935,888 | A * | 8/1999 | Toriyama | C04B 30/02 501/80 |
| 5,968,426 | A * | 10/1999 | Hirao | C04B 38/00 264/43 |
| 6,391,812 | B1 * | 5/2002 | Araki | C04B 35/5935 257/E23.009 |
| 6,544,917 | B1 * | 4/2003 | Miyanaga | B82Y 30/00 501/154 |
| 2001/0027158 | A1 * | 10/2001 | Itoh | C04B 35/591 501/97.2 |
| 2002/0164475 | A1 * | 11/2002 | Imamura | C01B 21/068 428/325 |
| 2004/0076806 | A1 * | 4/2004 | Miyanaga | B24B 337/042 428/210 |
| 2006/0014624 | A1 * | 1/2006 | Mikijelj | C04B 35/591 501/97.2 |
| 2011/0272187 | A1 * | 11/2011 | Kaga | C04B 35/584 174/260 |

FOREIGN PATENT DOCUMENTS

| | | |
|---|---|---|
| JP | H11-314969 | 11/1999 |
| JP | 2000-128643 | 5/2000 |
| JP | 2002-293642 | 10/2002 |
| JP | 2007-197226 | 8/2007 |
| JP | 2007-197229 | 8/2007 |

OTHER PUBLICATIONS

Kiyoshi Hirao et al., "Thermal Conductivity of be-ta-Si3N4 :II, Effect of Lattice Oxygen", Journal of the American Ceramic Society, vol. 83, No. 8, 1985-1992, 2000.

Hiroyuki Hayashi et al., "Effect of Oxygen Content on Thermal Conductivity of Sintered Silicon Nitride", Journal of the Ceramic Socitey of Japan, vol. 109, No. 12, 1046-1050, 2001, with English Abstract.

* cited by examiner

METHOD FOR PRODUCING SILICON NITRIDE SUBSTRATE

TECHNICAL FIELD

The present invention relates to a method for producing a silicon nitride substrate.

BACKGROUND ART

In recent years, with the increasingly higher integration and higher power of electronic devices and semiconductor devices, heat dissipation technology for dissipating heat generated from semiconductor elements are becoming extremely important. As such, there is a demand for a heat dissipation substrate with excellent heat dissipation properties that can be used as an insulating member in a semiconductor device, for example.

For example, metal or ceramics may be contemplated as the material of such a heat dissipation substrate. However, metal may be inferior to ceramics in terms of oxidation resistance, water resistance, and corrosion resistance, and more particularly, metal cannot be used without cooling under conditions exceeding 500° C. Further, because metal is electrically conductive, it is not suitable for use in an insulating substrate requiring high heat dissipation properties such as a high-density mounting substrate requiring insulation, for example.

On the other hand, ceramics have higher oxidation resistance, water resistance, and corrosion resistance as compared with metal. As such, for example, alumina and aluminum nitride have been used as materials of heat dissipation substrates. In particular, aluminum nitride has both excellent insulation and high thermal conductivity, and is therefore used as a heat dissipation substrate material for power modules. However, aluminum nitride has inferior mechanical properties, such as strength and fracture toughness, and is not sufficiently reliable such that its use is very limited.

On the other hand, a silicon nitride sintered bodies are widely known as excellent structural ceramic materials having both high strength and fracture toughness. Single crystals of such materials have a very high thermal conductivity estimated to be from 200 to 320 W/mK. As such, silicon nitride sintered bodies are expected to be used as materials of heat dissipation substrates. However, in a typical silicon nitride sintered body, impurities such as oxygen are dissolved in the silicon nitride particles. Thus, phonons for inducing thermal conduction may be scattered, and the terminal conductivity of the silicon nitride sintered body may be reduced to 20 to 80 W/mK, which is much lower than the estimated thermal conductivity of single crystals.

Non-Patent Literature Document 1 discloses that in order to achieve high thermal conductivity in a silicon nitride sintered body, a glassy phase of low thermal conductivity has to be reduced and the amount of oxygen dissolved in silicon nitride particles have to be reduced during sintering.

Note that silicon nitride has very high covalency and cannot be easily sintered. Thus, in order to obtain a dense sintered body, liquid-phase sintering using a sintering aid has to be performed.

Oxides may be used as the sintering aid to be added in producing a sintered body of silicon nitride. The added sintering aid forms a liquid phase by reacting with the silica on the surface silicon nitride powder during sintering, and this liquid phase promotes densification and grain growth. A large part of the liquid phase formed during sintering remains in the sintered body as a glassy phase upon cooling.

Further, in producing a sintered body of silicon nitride, rare earth oxides, which have high oxygen affinity, may be used as the sintering aid to be added in order to achieve higher thermal conductivity in the silicon nitride sintered body. When a rare earth oxide is added, the liquid phase that is formed traps a large amount of oxygen, and in this way, the amount oxygen dissolved in the silicon nitride particles may be reduced and higher thermal conductivity may be achieved in the silicon nitride sintered body.

However, when only a rare earth oxide is added as the sintering aid, the liquid phase that is formed has a high melting point such that it is difficult to obtain a dense sintered body having excellent mechanical properties. Thus, various approaches have been implemented for obtaining a silicon nitride sintered body with both excellent mechanical properties and high thermal conductivity.

For example, Patent Document 1 discloses a method for producing a high thermal conductivity silicon nitride sintered body that includes forming a compact by adding an oxide sintering aid to silicon powder containing Al at 0.1 wt % or less, the oxide sintering aid being made of at least one element selected from the group consisting of Mg, Ca, Sr, Ba, Y, La, Ce, Pr, Nd, Sm, Gd, Dy, Ho, Er and Yb at 0.5-10 wt %, and then sintering the compact under a nitrogen gas pressure ranging from 1 atm to 500 atm and a temperature ranging from 1700° C. to 2300° C. until a porosity of 5% or less and a predetermined structure is obtained. In this way, a high thermal conductivity silicon nitride sintered body with a thermal conductivity of at least 80 W/mK, a fracture toughness of at least 7 MPam$^{1/2}$, a bending strength (measured using the 4-point bending technique) of at least 600 MPa can be obtained.

Also, Patent Document 2 discloses a method for producing a high thermal conductivity silicon nitride sintered body by forming a compact of a raw material powder including silicon nitride powder by adding an oxide of at least one element selected from the group consisting of magnesium, yttrium, and lanthanoid elements at a total weight percent of 1.0 wt % or less, and then sintering the compact at a temperature of 1800° C. to 2000° C. and at a nitrogen gas pressure of 0.5 MPa to 10 MPa using a mixed powder consisting of silicon nitride, boron, and magnesium oxide as packing powder for adjusting the sintering atmosphere. Further, an example is disclosed where a silicon nitride sintered body with a thermal conductivity of at least 90 W/mk at room temperature and a 3-point bending strength of at least 600 MPa is obtained by controlling the particle size of the sintered body, the amount of oxygen in the silicon nitride particles, and the composition of the residual sintering aid to be within predetermined ranges.

Also, Non-Patent Literature Document 2 discloses that in the conventional sintering method, although grain growth of silicon nitride is promoted and thermal conductivity is improved as the sintering time is increased, the grain growth may be excessive such that the strength and fracture toughness of the silicon nitride sintered body substantially decreases in conjunction with the improvement of the thermal conductivity.

As exemplified by the above case, in the conventional method, a silicon nitride sintered body with a thermal conductivity of at least 80 W/mK and a bending strength of at least 600 MPa has been produced using silicon nitride powder, and optimizing process parameters, such as the type of sintering aid, the amount of sintering aid added, and sintering conditions.

However, in the methods disclosed in Patent Documents 1 and 2, manufacturing costs are increased because expensive silicon nitride powder is used. Also, when sintering conditions are adjusted to achieve a thermal conductivity higher than 100 W/mK, the strength and fracture toughness drastically decrease to thereby compromise mechanical reliability.

As can be appreciated, high thermal conductivity silicon nitride bodies obtained by conventional sintering methods do not adequately meet the two demands of manufacturing cost reduction and concurrence of high thermal conductivity and mechanical properties.

Thus, in terms of reducing the cost of the raw material powder, a high thermal conductivity silicon nitride material is being developed that uses inexpensive silicon powder as the raw material powder and uses a so-called reaction sintering process that involves nitriding the molded material in nitrogen and sintering the molded material at a high temperature thereafter.

For example, Patent Document 3 discloses a method for producing a $Si_3N_4$ sintered body by mixing 80 wt % to 99 wt % of Si powder containing oxygen at 1 wt % or less with 1 wt % to 20 wt % of oxide powder made of an oxide of at least one element selected from the group consisting of Y, Yb, and Sm, performing a nitriding process on the molded material at a temperature of 1400° C. or lower in a nitrogen atmosphere, and then sintering the resulting nitride material at a temperature of 1700° C. to 1950° C. in a nitrogen atmosphere. In such a method for producing a $Si_3N_4$ sintered body, a high purity Si powder with an oxygen content of 1 wt % or lower is used in order to suppress the dissolution of oxygen ion impurities into the $Si_3N_4$ crystal grains and increase the thermal conductivity of the $Si_3N_4$ sintered body. Also, it is disclosed that by additionally mixing into the raw material powder a reducing coating agent at 1 wt % to 10 wt % of the Si powder, and heating the compact at a temperature of 200° C. to 800° C. in a vacuum of 100 Torr or less or in a nitrogen atmosphere before performing the nitriding and sintering processes as described above, the oxygen content of the resulting $Si_3N_4$ sintered body can be further reduced and the thermal conductivity can be further improved.

Also, Patent Documents 4 and 5 disclose producing a silicon nitride sintered body by mixing an oxide of a rare earth element and a magnesium compound into silicon powder or a mixed powder of silicon powder and silicon nitride powder, the oxide of the rare earth element being mixed at 0.5 mol % to 7 mol % and the magnesium compound being mixed at 1 mol % to 7 mol % when the amount of silicon is converted into an amount of silicon nitride. The silicon nitride sintered body is produced by forming and nitriding the mixed material, and heating the resulting nitride body in a nitrogen atmosphere at a predetermined pressure to densify the nitride body such that a relative density of 95% or higher is achieved. In this way, a silicon nitride sintered body with a thermal conductivity of at least 100 W/mK, a 3-point bending strength of at least 600 MPa, and a fracture toughness of at least 7 MPam$^{1/2}$ can be obtained.

However, when a silicon nitride substrate is produced according to the methods for producing silicon nitride sintered bodies as described in Patent Documents 3-5, a porous modified layer having a thickness of about 90 μm to 140 μm and containing numerous pores is formed on a surface layer portion of the silicon nitride substrate. When a modified layer is included in the surface of the silicon nitride substrate, the electrical characteristics and mechanical strength of the silicon nitride substrate will be degraded, and as such, the portion of the silicon nitride substrate surface where the modified layer is formed has to be scraped off through polishing or the like. This in turn leads to an increase in the number of process steps and an increase in costs.

PRIOR ART DOCUMENTS

Patent Documents

Patent Document 1: Japanese Unexamined Patent Publication No. 9-30866
Patent Document 2: Japanese Unexamined Patent Publication No. 2002-293642
Patent Document 3: Japanese Unexamined Patent Publication No. 11-314969
Patent Document 4: Japanese Patent No. 5046221
Patent Document 5: Japanese Patent No. 4997431

Non-Patent Literature Documents

Non-Patent Literature Document 1: Journal of the American Ceramic Society, "Thermal Conductivity of be-ta-Si3N4 II: Effect of Lattice Oxygen," 83 [8] 1985-1992 (2000)
Non-Patent Document 2: Y. Hayashi et al., J. Ceram. Soc. Japan, 109, p. 1046 (2001)

SUMMARY OF THE INVENTION

Problem to be Solved by the Invention

The present invention has been conceived in view of the foregoing problems associated with the prior art, and it is an object of the present invention to provide a method for producing a silicon nitride substrate in which a raw material powder containing silicon powder can be used to produce a dense silicon nitride substrate that does not require removal of a modified layer after forming a sintered body.

Means for Solving the Problem

The present invention provides a method for producing a silicon nitride substrate, the method including a raw material powder preparation step of preparing a raw material powder containing a silicon powder, a rare earth element compound, and a magnesium compound, wherein, when the amount of silicon in the raw material powder is expressed in terms of a silicon nitride content, the raw material powder contains the rare earth element compound at an amount ranging from 1 mol % to 7 mol % in terms of an oxide content and contains the magnesium compound at an amount ranging from 8 mol % to 15 mol % in terms of an oxide content. The method further includes a sheet forming step of forming the raw material powder into a sheet shape to form a sheet article; a nitriding step of heating the sheet article in a nitrogen atmosphere at a temperature ranging from 1200° C. to 1500° C. and nitriding silicon contained in the sheet article; and a sintering step of sintering the sheet article that has undergone the nitriding step under a nitrogen atmosphere.

Advantageous Effect of the Invention

According to the present invention, a method for producing a silicon nitride substrate is provided in which a raw material powder containing silicon powder can be used to produce a dense silicon nitride substrate that does not require removal of a modified layer after forming a sintered body.

EMBODIMENTS FOR IMPLEMENTING THE INVENTION

Figure 1:
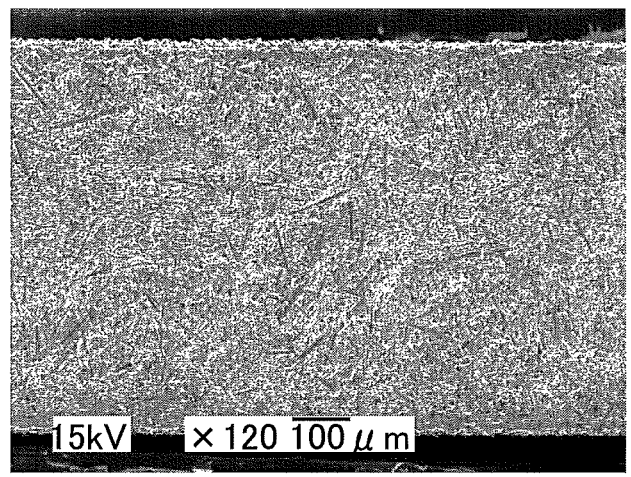
FIG. 1 is a cross-sectional SEM image of a silicon nitride substrate obtained in Example 1 of the present invention.

In the following, embodiments of the present invention are described with reference to the accompanying drawings. Note, however, that the present invention is not limited to the embodiments described below, and numerous variations and modifications may be made without departing from the scope of the present invention.

As an embodiment of the present invention, an example method for producing a silicon nitride substrate is described.

The method for producing a silicon nitride substrate according to the present embodiment may include the following process steps.

A raw material powder preparation step of preparing a raw material powder containing a silicon powder, a rare earth element compound, and a magnesium compound, wherein, when the amount of silicon in the raw material powder is expressed in terms of a silicon nitride content, the raw material powder contains the rare earth element compound at an amount ranging from 1 mol % to 7 mol % in terms of an oxide content and contains the magnesium compound at an amount ranging from 8 mol % to 15 mol % in terms of an oxide content.

A sheet forming step of forming the raw material powder into a sheet shape to form a sheet article.

A nitriding step of heating the sheet article in a nitrogen atmosphere at a temperature ranging from 1200° C. to 1500° C. and nitriding silicon contained in the sheet article.

A sintering step of sintering the sheet article that has undergone the nitriding step under a nitrogen atmosphere.

In the following, each of the above process steps is described.

(Raw Material Powder Preparation Step)

In the raw material powder preparation step, a raw material powder containing a silicon powder (metallic silicon powder), a rare earth element compound (rare earth element compound powder), and a magnesium compound (magnesium compound powder) at a predetermined ratio can be prepared. The silicon powder becomes a silicon source in the method for producing a silicon nitride substrate according to the present embodiment. The rare earth element compound and the magnesium compound are used as a sintering aid.

The conventional methods for producing a silicon nitride sintered body as described above propose a method of using only silicon nitride powder as the silicon source contained in the starting material. However, because silicon nitride powder is expensive, production costs increase when only silicon nitride powder is used as the silicon source. In contrast, in the method for producing a silicon nitride substrate according to the present embodiment, silicon powder is used as the raw material, and a silicon nitride substrate can be produced using reactive sintering.

Note that in some embodiments, silicon nitride powder may be used in addition to silicon powder as the silicon source. That is, a silicon powder or a mixed powder of silicon powder and silicon nitride powder may be used as the silicon source. However, the amount of silicon nitride powder contained in the silicon source of the raw material powder is preferably 20 mol % or less, and more preferably 10 mol % or less. More preferably, the amount of silicon nitride powder is 5 mol % or less such that material costs may be reduced. Note that because the silicon source contained in the raw material powder may only include silicon powder, the lower limit of the amount of silicon nitride powder contained in the silicon source of the raw material powder, may be, for example, 0 mol %. Note that the above molar concentration of silicon nitride represents the mole percentage of silicon nitride that is calculated by converting the amount of silicon in the raw material powder into an amount of silicon nitride, i.e., calculated by converting 1 mole of silicon of the silicon powder into 1/3 mole. More specifically, for example, in a case where the raw material powder contains 3 moles of silicon powder and 1 mole of silicon nitride powder as the silicon source, the amount of silicon nitride powder contained in the silicon source of the raw material powder would be 50 mol %.

The average particle diameter of the silicon powder or the mixed powder of silicon powder and silicon nitride powder is preferably in a range from 1 μm to 30 μm, and more preferably in a range from 5 μm to 15 μm.

Note that in the present descriptions, the average particle diameter refers to a particle diameter at an integrated value of 50% in a particle size distribution determined by the laser diffraction-scattering method.

In general, silicon nitride powder and silicon powder that are commercially available contain unavoidable impurities. Although the oxygen content of silicon nitride powder and silicon powder varies depending on properties of the powder, for example, the oxygen content of silicon nitride powder may be about 1.2 mass % and the oxygen content of silicon powder may be from about 0.2 mass % to several mass %.

The purity of the silicon nitride powder used in the method for producing a silicon nitride substrate according to the present embodiment is preferably in a range from 98% to 99.99%, and more preferably in a range from 99% to 99.9%.

Also, the purity of the silicon powder used in the method for producing a silicon nitride substrate according to the present embodiment is preferably at least 99%, and more preferably at least 99.5%

As described below, when producing a silicon nitride substrate, the amount of oxygen dissolved in the crystals of the silicon nitride sintered body is preferably reduced in order to improve the thermal conductivity of the silicon nitride substrate. In the method for producing a silicon nitride substrate according to the present embodiment, a silicon powder is used as a starting material and reaction sintering is implemented, and as such, the oxygen content in the crystals of the silicon nitride sintered body may be reduced as compared with the case of using only silicon nitride as the silicon source in the starting material. In the case of using a silicon powder as a starting material, a sheet forming step of forming a raw material powder corresponding to the starting material into a sheet article is performed, after which a nitriding step of nitriding the starting material is performed. In the nitriding step, a nitriding reaction as expressed by the following (Equation 1) is carried out.

$$3Si + 2N_2 = Si_3N_4 \quad \text{(Equation 1)}$$

In the above nitriding reaction, the weight of a sample increases by about 70%, and as such, the relative amount of oxygen impurities in the raw material powder may be reduced. Thus, as described above, by using silicon powder as the silicon source, the oxygen content in the crystals of the silicon nitride sintered body may be reduced as compared with the case of using only silicon nitride as the silicon source in the starting material.

In the method of producing a silicon nitride substrate according to the present embodiment, the relative amount of oxygen impurities in the raw material powder may be reduced by implementing the nitriding reaction as described above. For this reason, influences of the oxygen impurities in the raw material silicon powder may be minimal. Accordingly, in the method for producing a silicon nitride substrate according to the present embodiment, a variety of silicon powders may be used from low-grade silicon powders with a high oxygen impurity concentration to high-quality silicon powders with a low oxygen impurity concentration. However, a high-quality silicon powder with a low oxygen impurity concentration is preferably used in a case where the oxygen impurity content in the silicon nitride substrate has to be particularly low.

Further, when a compact of silicon powder is subjected to a nitriding process, the compact increases in weight without changing in size. In this way, the relative density of the resulting nitride body may be increased by ten percent as compared with the density of the compact before being subjected to the nitriding process. Thus, densification in a post-sintering process (sintering step) may be facilitated. Further, the sintering time may be reduced, and as such, the adverse effects of excessive grain growth on mechanical properties may be reduced, for example. As can be appreciated, by using reaction sintering in the method for producing a silicon nitride substrate according to the present embodiment, desirable characteristics may be obtained in terms of improving thermal conductivity of the silicon nitride substrate.

As described above, in the method for producing a silicon nitride substrate according to the present embodiment, a silicon nitride substrate may be produced by performing the nitriding step of nitriding a raw material powder containing silicon powder and then performing the sintering step. However, because silicon nitride is not easily sintered, a dense compact cannot be formed using only silicon nitride. Accordingly, a sintering aid is added in order to obtain a dense compact in the sintering process. Also, a decrease in thermal conductivity of a sintered body with respect to the theoretical thermal conductivity of single crystals is presumably caused by: (1) the existence of oxygen dissolved in the crystals of the silicon nitride sintered body, and (2) the existence of a grain boundary glassy phase with low thermal conductivity remaining in the silicon nitride sintered body. Thus, the thermal conductivity of the silicon nitride sintered body may be improved by: (a) reducing the amount of oxygen dissolved in the silicon nitride particles of the silicon nitride sintered body, and (b) reducing the grain boundary glassy phase with low thermal conductivity in the silicon nitride sintered body.

Therefore, the thermal conductivity of silicon nitride may presumably be improved by selecting a sintering aid that satisfies the above conditions. In order to (a) reduce the amount of oxygen dissolved in the silicon nitride particles of the silicon nitride sintered body, a rare earth element compound having high affinity to oxygen and the ability to effectively trap oxygen in the grain boundary glassy phase is preferably used as the sintering aid. Further, in order to (b) reduce the grain boundary glassy phase with low thermal conductivity in the silicon nitride sintered body, a magnesium compound that is capable of reducing the melting point of a melt produced during heating, contributing to densification in the initial sintering process, and being volatized at high temperatures is preferably used as the sintering aid.

When the inventors of the present invention investigated the causes of a modified layer being formed on the substrate surface in the conventional methods as described above, they discovered that the modified layer is formed as a result of the sintering aid being volatilized when producing the silicon nitride substrate.

In turn, for the purpose of producing a high thermal conductivity silicon nitride sintered body substrate through reaction sintering, the inventors of the present invention examined the influences of the composition of the sintering aid on the thermal conductivity and densification of the silicon nitride sintered body substrate obtained by performing a post sintering process on the nitride body. The present inventors thus discovered that a dense silicon nitride substrate that does not require removal of a modified layer after forming a sintered body can be produced by using a rare earth element compound and a magnesium compound as the sintering aid, and controlling the amount of the sintering aid added.

In the method for producing a silicon nitride substrate according to the present embodiment, a rare earth element compound and a magnesium compound are suitably used as the sintering aid. The rare earth element compound and the magnesium compound to be used as the sintering aid may be prepared as raw material powders in the raw material powder preparation step along with the silicon powder.

Although the amount of the rare earth element compound added is not particularly limited, the rare earth element compound is preferably added to the raw material powder at an amount ranging from 1 mol % to 7 mol % in terms of an oxide content when the amount of silicon in the raw material powder is expressed in terms of a silicon nitride content. Note that the above amount of the rare earth element compound (molar concentration) represents the molar concentration of the rare earth element in the raw material powder containing the three components, i.e., the silicon source (silicon powder, and silicon nitride powder if applicable), the rare earth element compound, and the magnesium compound. The same applies in the following descriptions.

As described above, the rare earth element compound has high affinity to oxygen and the ability to effectively trap oxygen in the grain boundary glassy phase. Therefore, when the amount of the rare earth element compound added is less than 1 mol %, adequate oxygen cannot be trapped in the grain boundary phase (grain boundary glassy phase) and the amount of oxygen dissolved in the silicon nitride particles may increase to thereby cause a decrease in thermal conductivity. Also, when the amount of the rare earth element added exceeds 7 mol %, the amount of the low thermal conductivity grain boundary phase containing the rare earth element compound may increase and the thermal conductivity of the sintered body may thereby decrease.

Particularly, when the amount of silicon in the raw material powder is expressed in terms of the silicon nitride content, the rare earth element compound is preferably added to the raw material powder at an amount ranging from 1.5 mol % to 5 mol %, and more preferably at an amount ranging from 2 mol % to 4 mol %.

Although there is no particular limitation to the rare earth element compound used, the rare earth element contained in the rare earth element compound preferably includes at least one element selected from the group consisting of Y, Sc, La, Ce, Nd, Sm, Gd, Dy, Ho, Er, and Yb. Further, more preferably, the rare earth element contained in the rare earth element compound is at least one element selected from the group consisting of Y, Sc, La, Ce, Nd, Sm, Gd, Dy, Ho, Er, and Yb. An example of the rare earth element compound includes a rare earth element oxide. Specific examples of rare earth element compounds that may be used include, for example, yttrium oxide, cerium oxide, oxide ytterbium, scandium oxide, and the like. Note that the rare earth element compound used is not limited to one type, and two or more types of rare earth element compounds may be used at the same time.

Although the amount of the magnesium compound added is not particularly limited, when the amount of silicon in the raw material powder is expressed in terms of a silicon nitride content, the magnesium compound is preferably added to the raw material powder at an amount ranging from 8 mol % to 15 mol % in terms of an oxide content. Note that the above amount of the magnesium compound (molar concentration) represents the molar concentration of the magnesium compound in the raw material powder containing the three components; i.e., the silicon source (silicon powder, and silicon nitride powder if applicable), the rare earth element, and the magnesium compound. The same applies in the following descriptions.

Note that when only a rare earth element compound is added as the sintering aid in producing a silicon nitride sintered body, sintering has to be performed at a very high temperature of up to 2000° C. and at a high nitrogen pressure of about 10 MPa to promote densification. As such, a special furnace has to be used and the processing cost increases as a result. Further, substantial grain growth occurs due to sintering at a very high temperature to thereby cause degradation in mechanical properties. Thus, in order to promote densification and achieve high strength and high fracture toughness during a post-sintering process, a magnesium compound is preferably added along with the rare earth element compound. By adding the magnesium compound, Mg ions may act as modifier ions for silicate glass nitride generated during heating to lower the viscosity of glass and promote densification. Also the magnesium compound may be evaporated and volatilized during sintering to thereby reduce the amount of the remaining grain boundary phase. Note that when the amount of magnesium compound added is less than 8 mol %, the magnesium may be volatilized before sintering contraction takes place, and as a result, a modified layer may be formed and a dense compact may not be obtained. Also, when the amount of magnesium compound added is more than 15 mol %, a large amount of magnesium may remain even after the post-sintering process (sintering step) to thereby cause a decrease in the thermal conductivity of the sintered body. Thus, when the amount of silicon in the raw material powder is expressed in terms of a silicon nitride content as described above, the magnesium compound is preferably added to the raw material powder at an amount ranging from 8 mol % to 15 mol % in terms of an oxide content. Further, more preferably, when the amount of silicon in the raw material powder is expressed in terms of a silicon nitride content, the magnesium compound may be added to the raw material powder at an amount ranging from 8 mol % to 10 mol % in terms of an oxide content.

Although there is no particular limitation to the type of magnesium compound used, for example, a silicide, a fluoride, a boride, or a nitride of magnesium, or a ternary compound of magnesium may be used. In particular, in view of handling facility, stability during processing, and the absence of toxic substances being generated, the magnesium compound added to the raw material powder preferably includes at least one magnesium compound selected from the group consisting of magnesium oxide (MgO), magnesium silicide ($Mg_2Si$), and silicon nitride magnesium ($MgSiN_2$). Further, more preferably, the magnesium compound added to the raw material powder is at least one magnesium compound selected from the group consisting of magnesium oxide (MgO), magnesium silicide ($Mg_2Si$), and silicon nitride magnesium ($MgSiN_2$).

Note that the raw material powder prepared in the raw material powder preparation step as described above may be a mixed powder prepared by mixing a silicon powder as the silicon source, the rare earth element compound, and the magnesium compound. Note, also, that in some cases, the raw material powder may further contain a silicon nitride powder as the silicon source as described above.

Alternatively, the components (powders) contained in the raw material powder may be weighed out without being mixed together, and the components of the raw material powder may be mixed together with other components of a slurry for forming a sheet article in the sheet forming step as described below.

(Sheet Forming Step)

In the sheet forming step, the raw material powder prepared to have a predetermined composition in the raw material powder preparation step may be formed into a sheet shape to form a sheet article (green sheet).

Specifically, first, the raw material powder prepared to have a predetermined composition in the raw material powder preparation step may be mixed together in a conventional manner in a ball mill or a planetary mill, using water or an organic solvent as a dispersion medium, and adding an organic binder or a dispersing agent as necessary.

Note that in some cases, the silicon powder (and silicon nitride powder in some cases), the rare earth element compound, and the magnesium compound contained in the raw material powder may be mixed together beforehand in the raw material powder preparation step as described above, and the mixed powder may be mixed with the above-described dispersion medium and the like. Alternatively, the powders such as silicon powder included in the raw material powder may only be weighed out in the raw material powder preparation step, and the powders such as silicon powder included in the raw material powder may be fed to a ball mill containing the above dispersion medium and the like, for example, such that mixing of the powders of the raw material powder and mixing of the raw material powder with the dispersion medium and the like may be performed at the same time. Note that the material, the addition amount, and the addition method for adding the dispersion medium, the organic binder, and the dispersing agent in preparing the slurry for forming the sheet article are not particularly limited and may be suitably selected depending on the method in which the sheet article is formed, for example.

In the following, example specific conditions for adding the dispersion medium, the organic binder, and the dispersing agent to the raw material powder are described.

First, powders constituting the raw material powder are weighed out to be in a predetermined ratio as described above in connection with the raw material powder preparation step. Then, for example, in a milling chamber of a ball mill, a dispersing agent introduced at an amount ranging from 0.5 wt % to 2 wt % with respect to the raw material powder, and a dispersion medium, such as an organic solvent, introduced at an amount ranging from 30 wt % to 70 wt % with respect to the raw material powder are mixed together, after which the raw material powder is introduced into the milling chamber. Note that examples of the dispersing agent that can be used include sorbitan ester dispersing agents and polyoxyalkylene dispersing agents. Examples of the organic solvent that can be used as the dispersion medium include ethanol and toluene. Note, also, that water can also be used as the dispersion medium as described above. Also, in some examples, the dispersing agents may not be added and only a dispersion medium may be used.

Thus, the raw material may be mixed and ground by the ball mill. Note that the mixing and grinding time is not particularly limited because the time may vary depending on the milling device used and the amount and properties of the raw material powder, for example. However, the grinding/mixing time is preferably set up such that the raw material powder may be adequately ground and mixed together. For example, the grinding/mixing time is preferably arranged to be in a range from 6 hours to 48 hours, and more preferably in a range from 12 hours to 24 hours. Note that in the case where the grinding/mixing time is less than 6 hours, the sintering aid may not be evenly mixed to thereby cause uneven sintering, or coarse silicon powder may remain to thereby adversely affect insulation properties, for example. Also, even when grinding/mixing is performed longer than 48 hours, no substantial changes would occur in the mixed state of the raw material, and moreover, impurities from the pot or balls may potentially be mixed into the raw material powder, for example. Note that after grinding/mixing the raw material, the dispersion medium may be removed as necessary.

Also, after grinding and mixing the raw material, an organic binder may be added and mixed at amount ranging from 5 wt % to 30 wt % to prepare a slurry. Although there is no particular limitation on the organic binder used, for example, a PVB-based (polyvinyl butyral) resin, an ethyl cellulose-based resin, or an acrylic resin may be suitably used.

The mixing time after adding the organic binder may also vary depending on the performance of the milling device that is used for mixing. For example, the mixing time is preferably arranged to be in a range from 1 hour to 24 hours, and more preferably in a range from 6 hours to 12 hours. Note that when the mixing time is less than 1 hour, the organic binder and the raw material powder may not be evenly mixed together such that cracks may occur in the sheet article when performing the sheet forming step, for example. Also, normally, even when the mixing is performed longer than 24 hours, no substantial change occurs in the mixed state of the organic binder and the raw material powder, and as such, the mixing time is preferably arranged to be no more than 24 hours from a productivity standpoint.

After adding and mixing the organic binder to form a slurry, the resulting slurry is subjected to vacuum defoaming to adjust the viscosity of the slurry. Then, the slurry is coated and formed into a sheet by a sheet forming machine.

As described above, after mixing the raw material powder and the dispersion medium using a ball mill or a planetary and removing the dispersion medium thereafter as necessary, an organic binder may be further added in some cases. Then, the raw material powder or a slurry including the raw material powder is formed into a sheet shape to form a sheet article. Note that although the method for forming the raw material powder into a sheet article is not particularly limited, for example, die molding, sheet molding, extrusion molding, cold isostatic press (CIP) molding, and the like may be used. In the method for producing a silicon nitride substrate according to the present embodiment, removal of a modified layer does not have to be performed because such a modified layer is not famed, and as such, the thickness of a modified layer does not have to be taken into account in forming the sheet article. Therefore, a sheet forming technique for easily forming a thin sheet may be suitably used.

The shape and size of the sheet article formed in the sheet forming step are not particularly limited. That is, the sheet article may be arranged into any suitable shape and size according to the required shape and size of the silicon nitride substrate to be produced. For example, the sheet article formed in the sheet forming step may preferably be arranged to have a thickness ranging from 0.05 mm to 2.5 mm, and more preferably a thickness ranging from 0.25 mm to 1.0 mm.

Also, the sheet article obtained in the sheet forming step may be cut into a predetermined size by a punching machine or the like as is necessary.

In the sheet forming step, the relative density of the resulting sheet article is preferably arranged to be at least 45%, and more preferably at least 50%. Note that in the case of cutting the resulting sheet article as described above, the relative density of the sheet article after being cut is preferably arranged to satisfy the above range. In the sheet forming step, the relative density of the resulting sheet article can be controlled by adjusting the amount of raw material powder contained in the slurry (solid concentration) and the amount of binder added to the slurry that is supplied to the sheet forming machine. By arranging the relative density of the resulting sheet article obtained in the sheet forming step to be at least 45%, pores in the sheet article can be sufficiently reduced, and the relative density of the silicon nitride substrate obtained after the sintering step described below may be increased. The upper limit for the relative density of the sheet article obtained in the sheet forming step is not particularly limited. However, in order to increase the relative density of the sheet article, the solid concentration of the slurry has to be increased by reducing the amount of binder added to the slurry, for example. Thus, to avoid complications resulting from the formation cracks and the like, the upper limit may preferably be set to 65%, and more preferably 60%, for example.

(Nitriding Step)

In the nitriding step, a nitriding process s performed on silicon included in the sheet article formed by the sheet forming step by heating the sheet article in a nitrogen atmosphere.

Note that before performing the above nitriding step on the sheet article obtained by the sheet forming step as described above, the sheet article may be pre-baked at a temperature of 800° C. or lower in order to remove the organic binder (used in the sheet forming step) remaining in the sheet article (binder removal process).

Further, in order to remove gas present in the furnace prior to starting the nitriding step, the furnace is preferably once evacuated and nitrogen gas is preferably supplied to the furnace thereafter to start the nitriding step. Although there is no particular limitation on the extent to which the furnace is to be evacuated before supplying the nitrogen gas, for example, the furnace may preferably be evacuated to 1 Pa or less, and more preferably evacuated to $10^{-1}$ Pa or less.

Although the heating temperature in the nitriding step is not particularly limited, for example, the heating temperature may preferably be arranged to be in a range from 1200° C. to 1500° C., and more preferably in a range from 1350° C. to 1480° C.

The process time of the nitriding step is preferably in a range from 1 hour to 15 hours, and more preferably in a range from 3 hours to 10 hours.

For example, when the heating temperature in the nitriding step is less than 1200° C., or when the process time of the nitriding step is too short, unreacted silicon powder may remain in the sheet article, and a dense sintered body may not be obtained after the sintering step. Also, when a nitriding reaction is performed at a temperature higher than 1500° C., or when the process time of the nitriding step is too long, the sintering aid component may be volatilized such that an adequate amount thereof may not remain in the sintering step, and as a result, a dense sintered body may not be obtained.

Note that the method of heating the sheet article in the nitriding step is not particularly limited. For example, multiple sheet articles may be stacked in between molding releasing boron nitride (BN) plates or BN powder and placed in a vacuum/pressurized atmosphere furnace including a graphite heat insulating material and a graphite heater. Note that a tight box-type electric furnace may be used as the vacuum/pressurized atmosphere furnace to discharge internally generated gas to the outside, for example. By using a furnace capable of discharging internally generated gas to the outside, in particular, by using a tight box-type electric furnace, for example, if a binder removal step for removing an organic binder used for molding is implemented, the binder removal step, the nitriding step, and the sintering step can be performed in one single furnace. In this way, productivity may be increased.

(Sintering Step)

In the sintering step, the sheet article that has undergone the nitriding step may be sintered in a nitrogen atmosphere.

Although the heating temperature in the sintering step is not particularly limited, for example, the heating temperature is preferably in a range from 1700° C. to 1950° C., and more preferably in a range from 1750° C. to 1900° C.

The process time of the sintering step is preferably arranged to be in a range from 1 hour to 48 hours, and more preferably in a range from 5 hours to 24 hours.

Note that when the heating temperature in the sintering step (a post-sintering temperature) is lower than 1700° C., or when the process time of the sintering step is too short, the sheet article may not be sufficiently densified. On the other hand, when the heating temperature in the sintering step is higher than 1950° C. or the process time of the sintering step is too long, excessive grain growth may occur and the strength of the resulting silicon nitride substrate may decrease.

Note that in the sintering step, heating is preferably carried out in a nitrogen atmosphere. Although the pressure of the nitrogen atmosphere is not particularly limited, for example, heating is preferably carried out under a pressure that would not cause the silicon nitride generated by the nitriding step to be decomposed by the heating temperature of the sintering step. Specifically the pressure is preferably arranged to be at least 0.1 MPa, for example, and more preferably at least 0.9 MPa. However, when the pressure of the nitrogen atmosphere is too high, a special furnace with high pressure resistance may have to be used. Thus, for example, the pressure of the nitrogen atmosphere is preferably arranged to be no more than 1 MPa, and more preferably no more than 0.92 MPa.

By performing the sintering step, for example, a silicon nitride substrate with a relative density of at least 95% may be obtained, and the silicon nitride substrate obtained after the sintering step may be a dense substrate that does not include a modified layer. Thus, the silicon nitride substrate obtained after the sintering step may be arranged to have a thermal conductivity of at least 80 W/mK, and more preferably at least 110 W/mK, where the above thermal conductivity is measured using the laser flash method with respect to the silicon nitride substrate obtained after the sintering step that has not undergone any further processing.

Further, the silicon nitride substrate that has undergone the sintering step may be a substrate mainly composed of β-phase silicon nitride and containing a rare earth element. Note that the rare earth element contained in the substrate may be in a single elemental state, or a compound with other elements. In this case, the amount of the rare earth element contained in the silicon nitride substrate, expressed in terms of an oxide content, is preferably in a range from 1 mol % to 4 mol %. Further, the amount of magnesium contained in the silicon nitride substrate that undergone the sintering step, expressed in terms of an oxide content, is preferably no more than 2 mol %. In the case where the silicon nitride substrate that has undergone the sintering step contains magnesium, the magnesium may be in a single elemental state or a compound with another element.

Although the thickness of the silicon nitride substrate obtained after the sintering step is not particularly limited and can be any desired thickness, for example, in the case where the silicon nitride substrate is used as an insulating heat dissipation substrate of a semiconductor device or an electronic device, its thickness is preferably arranged to be in a range from 0.05 mm to 2.5 mm. Note that the silicon nitride substrate obtained after the sintering step may be arranged to have a selected thickness by adjusting the thickness of the sheet article being formed in the sheet forming step.

According to an aspect of the method for producing a silicon nitride substrate of the present embodiment as described above, a method may be provided for using a raw material powder containing silicon powder to produce a dense silicon nitride substrate with a relative density of at least 95% and having no modified layer formed on its surface. According to another aspect of the method for producing a silicon nitride substrate of the present embodiment, a method may be provided for producing a silicon nitride substrate with a thermal conductivity of at least 80 W/mK, and more preferably at least 110 W/mK, where the above thermal conductivity is measured using the laser flash method with respect to the silicon nitride substrate obtained after the sintering step that has not undergone any further processing.

That is, according to the method for producing a silicon nitride substrate of the present embodiment, a method may be provided for using reaction sintering to produce a highly reliable and dense silicon nitride substrate with high thermal conductivity that does not require the removal of a modified layer after forming a sintered body. Further, a high thermal conductivity silicon nitride substrate produced by the above method and products using such a high thermal conductivity silicon nitride substrate may be provided.

Also, because a modified layer is not formed on the surface of the silicon nitride substrate obtained by the method for producing a silicon nitride substrate according to the present embodiment as described above, the removal of a modified layer is not required and the silicon nitride substrate does not have to be made thicker in contemplation of such removal process as in conventional methods. Therefore, the number of steps can be reduced and costs can be reduced as compared with conventional methods. Also, because the sheet article that has undergone the nitriding step and the sintering step may be thinner, a thin sheet forming method may be used to form the sheet article, for example.

EXAMPLES

In the following, specific example applications of the present invention are described. Note, however, that the present invention is not limited to these examples.

Example 1

Four types of silicon nitride substrates, identified as Sample No. 1-1 though Sample No. 1-4, were produced by the following procedure.

(Raw Material Powder Preparation Step)

A silicon powder with a purity of 99.9%, an average particle diameter of 10 μm, and an oxygen impurity content of 0.10 mass % was used. As for the magnesium compound, a magnesium oxide powder having an average particle size of 0.1 μm (manufactured by Ube Material Industries, Ltd.) or a silicon magnesium nitride powder having an average particle size of 1.0 μm was used. Also, as for the rare earth element compound, an yttrium oxide powder having an average particle diameter of 1.5 μm (manufactured by Shin-Etsu Chemical Co., Ltd.) was used.

Note that the oxygen impurity content in the silicon powder was measured using a nitrogen/oxygen analyzer (manufactured by LECO Japan Corporation; Model: TC-600).

The above raw materials were weighed out to prepare raw material powders having the compositions of Sample No. 1-1 through Sample No. 1-4 as indicated in Table 1 below. Note that in Table 1, only the ratios of the magnesium compound and the rare earth element compound are indicated, but the silicon powder constitutes the remaining portion. Further, the mole ratios indicated in Table 1 represent mole ratios calculated by converting the amount of silicon (Si) into an amount of silicon nitride ($Si_3N_4$) under the assumption that the silicon (Si) included in the raw material powder has been completely nitrided into silicon nitride ($Si_3N_4$), and converting the amount of the magnesium compound into an amount of magnesium oxide (MgO).

(Sheet Forming Step)

Using ethanol as a dispersion medium, and using a resin pot and silicon nitride balls, the raw material powders of the above samples prepared in the raw material powder preparation step were ground and mixed in a ball mill for 24 hours. Note that an appropriate amount of ethanol was weighed out beforehand and introduced into the resin pot such that the concentration of the slurry would be 45 wt %. After grinding and mixing the above materials, a resin binder (manufactured by Sekisui Chemical Co., Ltd.; product name: S-LEC) as an organic binder was added at 10 wt %, and the materials were further mixed for 12 hours. Then, viscosity adjustment was performed on the materials using a vacuum defoaming machine (manufactured by Sayama Riken) to prepare coating slurries. Then, the slurries for the above samples that have been subjected to viscosity adjustment were formed into sheets each having a thickness of 0.4 mm using a doctor blade. Then, the sheets were cut into 40 mm×40 mm×0.4 mm sheet articles, and their relative densities were evaluated. Note that the relative densities of the sheet articles were evaluated through measurement. The relative densities obtained for the sheet articles corresponding to the above samples were all in a range from 53.0% to 54.8%.

(Nitriding Step)

After forming the sheet articles and evaluating their relative densities in the sheet forming step, boron nitride powder (hereinafter also referred to as "BN powder") was applied on the surfaces of the sheet articles, and the sheet articles were stacked into sets of 12 and placed in a boron nitride crucible (hereinafter also referred to as "BN crucible"). Thereafter, the BN crucible was placed in a vacuum/pressurized atmosphere furnace (manufactured by Fujidempa Kogyo. Co., Ltd.; Model: Multi500) and then heated in vacuum for 4 hours at 800° C. to perform a binder removal step. After completing the binder removal step, the interior of the furnace was once evacuated to $10^{-1}$ Pa after which nitrogen was introduced into the furnace to perform a nitriding process for 8 hours in a nitrogen atmosphere of 0.1 MPa and at a temperature of 1400° C. Note that a 99.9 vol % nitrogen gas was used as the nitrogen gas.

When X-ray diffraction was performed on the resulting nitride samples using an X-ray diffraction analyzer (manufactured by Rigaku Corporation Model: RINT 2500), residual Si was not observed in any of the samples.

(Sintering Step)

Then, as a post-sintering step, the sheet articles corresponding to the above samples that have undergone the nitriding process in the nitriding step were sintered under the corresponding sintering conditions for the samples indicated in Table 1. Note that the sintering step was performed using the same vacuum/pressurized atmosphere furnace used in the nitriding step, and the sheet articles were stacked in the same manner and placed in a BN crucible, after which the BN crucible was placed in the vacuum/pressurized atmosphere furnace.

After the sintering step, the sintered sheet articles (silicon nitride substrates) were taken out of the BN crucible, and BN powder and the like adhered to the surface of the substrates were removed by a sandblasting apparatus. Then, the resulting substrates were subjected to phase identification by X-ray diffraction, and the relative densities of the substrates were measured using the Archimedes method. Further, observations of cross sections of the silicon nitride substrates were made using a scanning electron microscope (SEM) (manufactured by JEOL Ltd.; Model: JSM-5600).

Further, the silicon nitride substrates were cut into 25 mm×25 mm square pieces to measure their thermal conductivity using the laser flash method (ULVAC Co., Ltd. Model: TC-9000).

Table 1 indicates evaluation results of the samples. Also, FIG. 1 is a cross-sectional SEM image of Sample No. 1-1.

TABLE 1

| SAMPLE NO. | Si PURITY | SINTERING AID COMPOSITION | SINTERING CONDITIONS TEMPERATURE | TIME | N2 PRESSURE | RELATIVE DENSITY | THERMAL CONDUCTIVITY |
|---|---|---|---|---|---|---|---|
| 1-1 | 99.9% | 2 mol % $Y_2O_3$ 8 mol % MgO | 1900° C. | 6 hr | 0.9 MPa | 99.20% | 123 W/mK |
| 1-2 | 99.9% | 2 mol % $Y_2O_3$ 10 mol % $MgSiN_2$ | 1900° C. | 6 hr | 0.9 MPa | 99.30% | 120 W/mK |
| 1-3 | 99.9% | 2 mol % $Y_2O_3$ 15 mol % MgO | 1900° C. | 6 hr | 0.9 MPa | 99.00% | 110 W/mK |
| 1-4 | 99.9% | 2 mol % $Y_2O_3$ 8 mol % MgO | 1900° C. | 24 hr | 0.9 MPa | 98.60% | 149 W/mK |
| 1-5 | 99.5% | 2 mol % $Y_2O_3$ 8 mol % MgO | 1900° C. | 6 hr | 0.9 MPa | 99.40% | 110 W/mK |
| 1-6 | 99.5% | 2 mol % $Y_2O_3$ 10 mol % $MgSiN_2$ | 1900° C. | 6 hr | 0.9 MPa | 99.20% | 108 W/mK |
| 1-7 | 99.5% | 2 mol % $Y_2O_3$ 15 mol % MgO | 1900° C. | 6 hr | 0.9 MPa | 99.10% | 99 W/mK |
| 1-8 | 99.5% | 2 mol % $Y_2O_3$ 8 mol % MgO | 1900° C. | 24 hr | 0.9 MPa | 99.00% | 133 W/mK |
| 1-9 | 99% | 2 mol % $Y_2O_3$ 8 mol % MgO | 1900° C. | 6 hr | 0.9 MPa | 99.20% | 90 W/mK |
| 1-10 | 99% | 2 mol % $Y_2O_3$ 10 mol % $MgSiN_2$ | 1900° C. | 6 hr | 0.9 MPa | 99.20% | 84 W/mK |
| 1-11 | 99% | 2 mol % $Y_2O_3$ 15 mol % MgO | 1900° C. | 6 hr | 0.9 MPa | 99.10% | 80 W/mK |
| 1-12 | 99% | 2 mol % $Y_2O_3$ 8 mol % MgO | 1900° C. | 24 hr | 0.9 MPa | 98.80% | 116 W/mK |

First, upon performing phase identification of the samples through X-ray diffraction, it was confirmed that silicon nitride could be obtained in all of the samples.

As can be appreciated from FIG. 1 showing a cross-sectional image of the silicon nitride substrate corresponding to Sample No. 1-1, the SEM observation of the sample revealed that no modified layer was present in the sample. Note that SEM observations were similarly conducted on the other samples of the present example, and these SEM observations similarly confirmed the absence of a modified layer in the samples.

Further, as can be appreciated from the results shown in Table 1, the silicon nitride substrates produced in Example 1 were all dense bodies with relative densities of at least 95%, and even the sample with the lowest thermal conductivity had a thermal conductivity of 110 W/mK while the sample with the highest thermal conductivity had a thermal conductivity of 149 W/mK.

Example 2

In Example 2, a silicon powder with a purity of 99.5% was used as the silicon powder in the raw material powder preparation step. Raw material powders for Sample No. 1-5 through Sample No. 1-9 were prepared by weighing out the silicon powder and the sintering aid to achieve the compositions of Sample No. 1-5 through Sample No. 1-8 shown in Table 1. Aside from the above differences, silicon nitride substrates of Example 2 were produced under the same conditions as Example 1. It was confirmed that silicon nitride could be obtained in all the silicon nitride substrates produced in Example 2, and no modified layer was included in the silicon nitride substrates. Further, the silicon nitride substrates produced in Example 2 were all dense bodies with relative densities of at least 99%, and even the sample with the lowest thermal conductivity had a thermal conductivity of 99 W/mK while the sample with the highest thermal conductivity had a thermal conductivity of 133 W/mK.

Example 3

In Example 3, a silicon powder with a purity of 99% was used as the silicon powder in the raw material powder preparation step. Raw material powders for Sample No. 1-9 through Sample No. 1-12 were prepared by weighing out the silicon powder and the sintering aid to achieve the compositions of Sample No. 1-9 through Sample No. 1-12 shown in Table 1. Aside from the above differences, silicon nitride substrates of Example 3 were produced under the same conditions as Example 1. It was confirmed that silicon nitride could be obtained in all the silicon nitride substrates produced in Example 3, and no modified layer was included in the silicon nitride substrates. Further, the silicon nitride substrates produced in Example 3 were all dense bodies with relative densities of at least 99%, and even the sample with the lowest thermal conductivity had a thermal conductivity of 8.0 W/mK while the sample with the highest thermal conductivity had a thermal conductivity of 116 W/mK.

Comparative Example 1

Silicon nitride substrates were produced by the following procedure and evaluated.

A silicon powder with a purity of 99.9%, an average particle diameter of 10 μm, and an oxygen impurity content of 0.16 mass % was used as the silicon powder. As for the magnesium compound, a magnesium oxide powder having an average particle diameter of 0.1 μm (Ube Material Industries, Ltd.) was used. As for the rare earth element compound, an yttrium oxide powder having an average particle diameter of 1.5 μm (manufactured by Shin-Etsu Chemical Co., Ltd.) was used. Note that the oxygen impurity content of the silicon powder was measured using a nitrogen/oxygen analyzer as in Example 1.

The above raw material powders were weighed out such that a mixture thereof achieves a mole ratio of $Si_3N_4$:Y2O3:MgO=93:2:5. Note that the above mole ratio represents a mole ratio that is obtained by converting the amount of silicon (Si) into an amount of silicon nitride ($Si_3N_4$) under the assumption that silicon (Si) has been completely nitrided into silicon nitride ($Si_3N_4$) and converting the amount of magnesium compound into an amount of magnesium oxide (MgO).

The raw material powders weighed out to have the above composition were mixed for 2 hours at a rotational speed of 250 rpm in ethanol using a planetary mill (manufactured by Fritsch Japan Co., Ltd.). Note that a silicon steel pot and silicon nitride balls (diameter p 1.0 mm) were used to mix the above materials.

Then an evaporator was used to evaporate the solvent in the mixed raw material powder and ethanol, and vacuum drying was performed at 110° C. for 4 hours to prepare the raw material powder corresponding to a starting material. After obtaining approximately 36 g of raw material powder from the above procedure, the raw material powder was formed into a 75 mm×75 mm×5 mm compact through die pressing and then subjected to a CIP process at 300 MPa.

The compact was then embedded in BN powder in a BN crucible, and the BN crucible was set in a carbon crucible. Then, using a carbon heater furnace, the compact was subjected to a nitriding process for 8 hours at 1400° C. in a nitrogen atmosphere of 0.1 MPa. After the nitriding process, the compact was subjected to post-sintering for 6 hours at 1900° C. in a pressurized nitrogen atmosphere of 0.9 MPa.

Figure 2A:
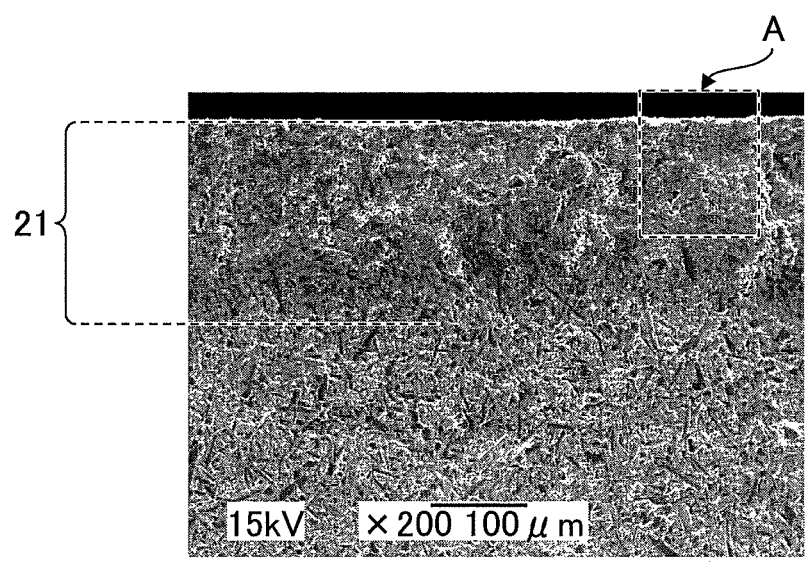
FIG. 2A is a cross-sectional SEM image of a silicon nitride substrate obtained in Comparative Example 1.
Figure 2B:
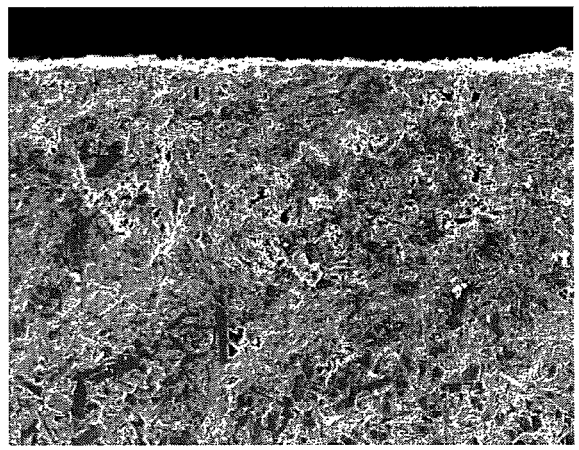
FIG. 2B is another cross-sectional SEM image of the silicon nitride substrate obtained in Comparative Example 1.

Then, the relative density of the resulting sintered body sample was measured using the Archimedes method. Also, an SEM observation of a cross section of the sample was conducted as in Example 1. FIGS. 2A and 2B are SEM cross-sectional images of the sample obtained by the above SEM observation. Note that FIG. 2B is an enlarged view of the region surrounded by dotted line A in FIG. 2A.

As can be appreciated from FIGS. 2A and 2B, a modified layer 21 including numerous pores was formed on a surface layer portion of the sample produced in the present example, and the modified layer 21 was about 200 μm thick.

Also, although the resulting silicon nitride substrate had a relative density of 98.7%, because its surface layer portion includes a modified layer as described above, the modified layer has to be removed to be used as a substrate.

Comparative Example 2

Two types of silicon nitride substrates, identified as Sample No. 2-1 and Sample No. 2-2, were produced by the following procedure and evaluated.

A silicon powder with a purity of 99.9%, an average particle diameter of 10 μm, and an oxygen impurity content of 0.16 mass % was used as the silicon powder. As for the magnesium compound, a magnesium oxide powder with an average particle size of 1.0 μm (manufactured by Ube Material Industries, Ltd.) or a silicon magnesium nitride powder with an average particle diameter of 0.1 μm was used. As for the rare earth element compound, an yttrium oxide powder with an average particle diameter of 1.5 μm (manufactured by Shin-Etsu Chemical Co., Ltd.) was used. Note that the oxygen impurity content in the silicon powder was measured using a nitrogen/oxygen analyzer.

The raw material powders for the above samples were prepared by weighing out the above materials to achieve the compositions of Sample No. 2-1 and Sample No. 2-2 as indicated in Table 2 shown below. Note that in Table 2, only the ratios of the magnesium compound and the rare earth element compound are indicated, but the silicon powder constitutes the remaining portion. Further, the mole ratios indicated in Table 2 represent mole ratios calculated by converting the amount of silicon (Si) into an amount of silicon nitride ($Si_3N_4$) under the assumption that the silicon (Si) has been completely nitrided into silicon nitride ($Si_3N_4$), and converting the amount of the magnesium compound into an amount of magnesium oxide (MgO).

Using methanol as the dispersion medium, and using a resin pot and silicon nitride balls, the raw material powder was subjected to grinding/mixing for 24 hours in a ball mill. After the grinding/mixing process, a resin binder as (Sekisui Chemical Co., Ltd.; product name: S-LEC) was added at 10 mass %, and mixing was further performed for 12 hours. Then, viscosity adjustment of the mixed materials was performed using a vacuum defoaming machine to produce coating slurries for each of the samples. The slurries that have undergone viscosity adjustment were formed into sheets with a thickness of 0.4 mm using a doctor blade.

After the sheet forming process, the sheets were cut into 40 mm×40 mm×0.4 mm sheet articles, and their relative densities were evaluated. The relative densities of the sheet articles were evaluated by measurement. The relative density of the resulting sheet articles was 53.6%.

Thereafter, BN powder was applied on the surfaces of the sheet articles, and the sheet articles were stacked into sets of 12 and placed in a BN crucible. Then, the BN crucible was set in a vacuum/pressurized atmosphere furnace and heated for 4 hours at 800° C. in vacuum to perform a binder removal process.

Then, after evacuating the vacuum/pressurized atmosphere furnace to 1 Pa or less, nitrogen was introduced into the furnace and heating was performed for 4 hours at 1450° C. in a nitrogen atmosphere of 0.11 MPa to perform a nitriding process. Note that residual Si was not detected in any of the samples obtained after the nitriding process when X-ray diffraction measurements were made on the resulting samples.

Then, as a post-sintering process, the nitride samples were sintered in a pressurized nitrogen atmosphere of 0.9 MPa for 6 hours at 1900° C.

After the sintering step, the plate-shaped sintered bodies were taken out of the BN crucible.

Comparative Example 3

In Comparative Example 3, a silicon powder with a purity of 99% was used as the silicon powder. Aside from the above difference, silicon nitride substrates corresponding to Sample No. 2-3 and Sample No. 2-4 were produced in the same manner as Sample No. 2-1 and Sample No. 2-2 and evaluated.

Figure 3:
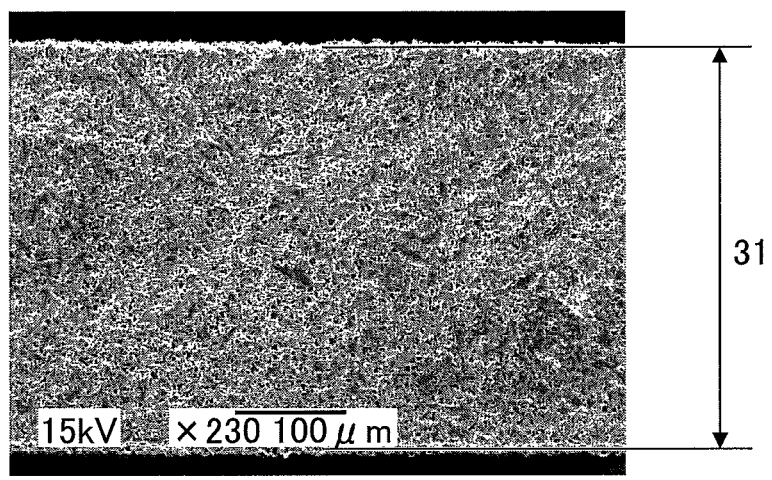
FIG. 3 is a cross-sectional SEM image of a silicon nitride substrate obtained in Comparative Example 2.

The thermal conductivities of the resulting substrates were measured using the Archimedes method, and phase identification of the substrates was performed through X-ray diffraction. Further, observations were made on cross sections of the resulting silicon nitride substrates using a scanning electron microscope (SEM) (manufactured by JEOL Ltd. Model JSM-5600). Table 2 and FIG. 3 indicate results of the evaluations and observations. Note that FIG. 3 is a cross-sectional SEM image of Sample No. 2-1.

TABLE 2

| SAMPLE NO. | Si PURITY | SINTERING AID COMPOSITION | SINTERING CONDITIONS TEMPERATURE | TIME | N₂ PRESSURE | RELATIVE DENSITY |
|---|---|---|---|---|---|---|
| 2-1 | 99.9% | 2 mol % $Y_2O_3$<br>5 mol % MgO | 1900° C. | 6 hr | 0.9 MPa | 67.20% |
| 2-2 | 99.9% | 2 mol % $Y_2O_3$<br>5 mol % $MgSiN_2$ | 1900° C. | 6 hr | 0.9 MPa | 68.40% |
| 2-3 | 99% | 2 mol % $Y_2O_3$<br>5 mol % MgO | 1900° C. | 6 hr | 0.9 MPa | 68.10% |
| 2-4 | 99% | 2 mol % $Y_2O_3$<br>5 mol % $MgSiN_2$ | 1900° C. | 6 hr | 0.9 MPa | 65.90% |

First, when phase identification of the samples were performed through X-ray diffraction, it was confirmed that silicon nitride could be obtained in all of the samples.

Further, as can be appreciated from Table 2, the relative densities of the silicon nitride substrates produced in Comparative Example 2 were lower at 67.2% and 68.4%. This may be due to the formation of a modified layer 31 having numerous pores across the entire substrate as shown in FIG. 3. As such, a dense body could not be obtained in Comparative Example 2. Because the modified layer 31 constitutes the entire substrate in the substrate sample shown in FIG. 3, the thickness of the modified layer 31 was 400 μm.

Note that although FIG. 3 is a cross-sectional SEM image of Sample No. 2-1, it was confirmed from the SEM images obtained for Samples No. 2-2 through Sample No. 2-4 that modified layers similarly constituted the entire substrates in these samples.

Although a method for producing a silicon nitride substrate according to the present invention has been described above with respect to illustrative embodiments and examples, the present invention is not limited to the above embodiments and examples. That is, various modifications and changes can be made within the scope of the present invention.

The present application is based on and claims the benefit of priority of Japanese Patent Application No. 2014-074340 filed on Mar. 31, 2014 and Japanese Patent Application No. 2015-072347 filed on Mar. 31, 2015, the entire contents of which are herein incorporated by reference.

The invention claimed is:

1. A method for producing a silicon nitride substrate, the method comprising:
a raw material powder preparation step of preparing a raw material powder containing a silicon powder, an oxide of a rare earth element compound, and an oxide of a magnesium compound, wherein, when the amount of silicon in the raw material powder is expressed as a mol % amount of silicon nitride, the raw material powder-contains
the oxide of the rare earth element compound in an amount ranging from 2 mol % to 7 mol %, and
the oxide of the magnesium compound in an amount ranging from 8 mol % to 15 mol %;
a sheet forming step of forming a slurry by mixing the raw material powder with a dispersion medium, and then forming the slurry into a sheet shape to form a sheet article;
a nitriding step of heating the sheet article in a nitrogen atmosphere at a temperature ranging from 1200° C. to 1500° C. and nitriding silicon contained in the sheet article; and
a sintering step of sintering the sheet article that has undergone the nitriding step under a nitrogen atmosphere to form the silicon nitride substrate, and
a measuring step of measuring a thermal conductivity of the silicon nitride substrate obtained after the sintering step by a laser flash method to confirm that the obtained silicon nitride substrate has a thermal conductivity of at least 80 W/mK.

2. The method for producing a silicon nitride substrate according to claim 1, wherein
the magnesium compound includes at least one magnesium compound selected from the group consisting of magnesium oxide, magnesium silicide, and magnesium silicon nitride.

3. The method for producing a silicon nitride substrate according to claim 1, wherein
a rare earth element contained in the rare earth element compound includes at least one element selected from the group consisting of Y, Sc, La, Ce, Nd, Sm, Gd, Dy, Ho, Er, and Yb.

4. The method for producing a silicon nitride substrate according to claim 1, wherein
the sheet article obtained by the sheet forming step has a relative density of at least 45%.

5. The method for producing a silicon nitride substrate according to claim 1, wherein during the forming of the slurry, an organic binder is mixed with the raw material powder and the dispersion medium in an amount ranging from 5 wt % to 30 wt %.

6. The method for producing a silicon nitride substrate according to claim 1, wherein the method further comprises:
a vacuum defoaming step of subjecting the slurry to vacuum defoaming after the slurry is formed to adjust the viscosity of the slurry.

7. The method for producing a silicon nitride substrate according to claim 1, wherein the slurry is formed into the sheet article to a thickness in the range of from 0.05 mm to 2.5 mm using a doctor blade.

* * * * *